March 24, 1942.  H. L. CLARK ET AL  2,277,037
FRUIT RIPENESS TESTER
Filed Jan. 16, 1940
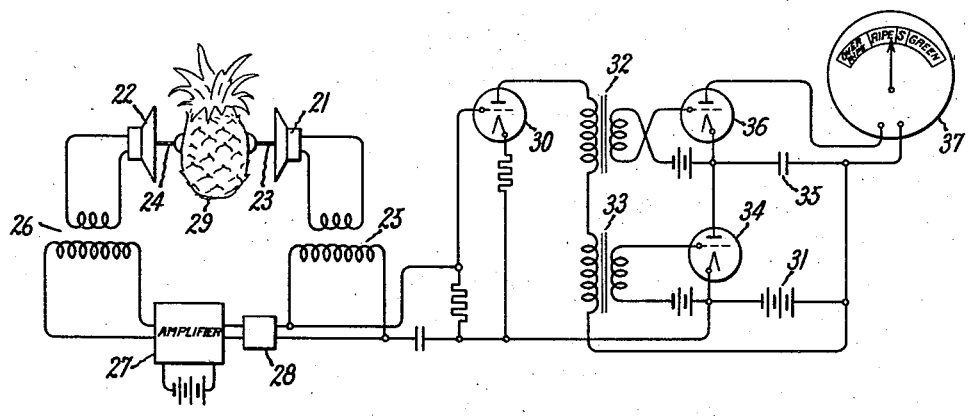
Inventors:
Howard L. Clark,
Walter Mikelson,
by Harry E. Dunham
Their Attorney.

Patented Mar. 24, 1942

2,277,037

UNITED STATES PATENT OFFICE 2,277,037

FRUIT RIPENESS TESTER

Howard L. Clark, Ballston Lake, and Walter Mikelson, Schenectady, N. Y., assignors to General Electric Company, a corporation of New York Application January 16, 1940, Serial No. 314,075

1 Claim. (Cl. 73—51)

Our invention relates to apparatus for determining a condition of an object by measurement of its vibration characteristics. For example, we are able to determine the degree of ripeness of fruit such as melons and pineapples by the measurement and calibration of the vibration characteristics of such objects.

In the case of many fruits, for example the pineapple, when the fruit is green it is more nearly solid than when ripe. As it ripens its internal structure changes from what may be considered as a semi-solid condition to what may be considered as a semi-liquid condition. This change is accompanied by a change in vibration characteristics. When green the fruit is a better transmitter of vibrations than when ripe. Also its natural period of vibration decreases as it becomes ripe. We have found that such changes in vibration characteristics can be measured for the purpose of determining the degree of ripeness with reliability.

The features of our invention which are believed to be novel and patentable will be pointed out in the claim appended hereto. For a better understanding of our invention, reference is made in the following description to the accompanying drawing which shows a vibration system for testing the ripeness of pineapples where a vibration feed-back oscillating circuit is employed to transmit vibrations through the object under test, in this case a pineapple.

In the drawing 21 represents a vibration transmitter and 22 a vibration pickup device. Their vibratory elements are placed in contacting relations to opposite sides of the fruit sample 29 to be tested by suitable contact rods 23 and 24. These contact rods should not have sharp ends but rather blunt or enlarged contact surfaces in engagement with the fruit. The transmitter and receiver are electrically connected together through a regenerative feed-back circuit of a conventional type, including coupling transformers 25 and 26. 27 represents an amplifier having its input circuit supplied from transformer 26 and having its output circuit feeding transformer 25. We prefer to include a phase shifter indicated at 28 somewhere in the circuit in order to quickly obtain a phase relationship favorable to regenerative action. Such a system when properly adjusted will oscillate at a frequency which depends upon the vibration characteristics of the fruit sample 29. Vibrations generated at 21 are transmitted through the object 29 and picked up at 24, converted into current pulsations at 22, amplified at 27 and reconverted into mechanical vibrations at 21. The vibration characteristics of the sample at 29 determines the frequency of the oscillations. The system will vibrate at what may be considered to be the natural period of vibration of the sample 29 for this hook-up. We have found that this natural period of vibration decreases with the degree of ripeness of the fruit sample.

It remains then to measure the frequency of the system in properly calibrated terms of fruit ripeness. This may be accomplished by any suitable form of sensitive frequency meter.

Frequency measuring apparatus which we have found satisfactory is shown. At 30 is a vacuum tube having its input circuit coupled to the oscillation circuit through a suitable grid leak as shown and its output circuit connected to a source of supply 31 through the primaries of two transformers 32 and 33. The purpose of tube 30 is to pass the vibration impulses on to the transformers at a constant voltage and a tube satisfactory for this purpose is selected. Hence, transformers 32 and 33 are energized by pulsations of constant magnitude but which vary in frequency as the frequency of the oscillation varies.

The secondary of transformer 33 is connected to control a rectifier tube 34, the output circuit of which is connected to charge a condenser 35. The secondary of transformer 32 is connected to control a rectifier tube 36 which is connected to discharge condenser 35. It will be noted that the secondaries of the transformers 32 and 33 are connected to the input circuits of tubes 36 and 34, in inverse or 180 degree phase relation so that condenser 35 is charged through tube 34 during one-half of the cycle of the alternating current voltage wave induced in the secondary circuit of the transformer, and tube 36 discharges condenser 35 during the other half of the cycle. Hence condenser 35 is charged and discharged once per cycle and the current flow per cycle is constant. The current flow to or from the condenser is measured by a sensitive direct current instrument 37. In the illustration the instrument 37 measures the discharge current. Hence the current flow through instrument 37 in a given period of time of several cycles is proportional to the frequency and the instrument is sufficiently damped to respond thereto and produce a steady deflection proportional to frequency. Instrument 37 may therefore be calibrated in terms of the natural period of vibration of the fruit sample at 29 or in terms of its ripeness. With the set-up and testing pineapples, the frequency of oscillation varies from about 100 to 200 cycles from ripe to green pineapples.

What we claim as new and desire to secure by Letters Patent of the United States is:

Apparatus for testing fruit to determine its condition of ripeness comprising an electro-magnetic transmitter and an electro-magnetic receiver, each of the telephone type and each having their vibratory magnetic membrane members adapted to be connected in vibration transmitting relation with a sample of fruit to be tested such that mechanical vibrations may be transmitted from transmitter to receiver through such fruit sample in accordance with the mechanical vibration characteristics of such sample, electrical connections including an amplifier coupling the coils of the transmitter and receiver such that when a fruit sample is in testing position a regenerative feed-back oscillatory circuit is formed, the frequency of oscillation of which is determined by the mechanical vibration characteristics of such sample, and means for measuring the frequency of said oscillating circuit independently of the intensity of the oscillating current therein in terms of the condition of fruit ripeness.

HOWARD L. CLARK.
WALTER MIKELSON.